United States Patent
De Perthuis et al.

(10) Patent No.: US 6,959,371 B2
(45) Date of Patent: Oct. 25, 2005

(54) DYNAMIC ACCESS CONTROL OF A FUNCTION TO A COLLECTIVE RESOURCE

(75) Inventors: Hugues De Perthuis, Garcelles (FR); Eric Desmicht, Caen (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 444 days.

(21) Appl. No.: 10/228,442

(22) Filed: Aug. 27, 2002

(65) Prior Publication Data
US 2003/0046506 A1    Mar. 6, 2003

(30) Foreign Application Priority Data
Aug. 31, 2001  (FR)  ................................. 01 11321

(51) Int. Cl.[7] ............................................. G06F 12/00
(52) U.S. Cl. .................... 711/167; 711/100; 711/154
(58) Field of Search ...................... 711/100, 154, 167; 713/500, 510, 502

(56) References Cited

U.S. PATENT DOCUMENTS

| | | | |
|---|---|---|---|
| 5,163,140 A | * | 11/1992 | Stiles et al. ................. 711/140 |
| 6,067,616 A | * | 5/2000 | Stiles et al. ................. 712/239 |
| 6,112,019 A | * | 8/2000 | Chamdani et al. ........... 712/214 |
| 6,266,741 B1 | * | 7/2001 | Hui et al. .................... 711/122 |
| 6,282,614 B1 | * | 8/2001 | Musoll ........................ 711/122 |
| 6,324,643 B1 | * | 11/2001 | Krishnan et al. ............ 712/237 |

FOREIGN PATENT DOCUMENTS

EP    0921468 A1    6/1999

* cited by examiner

*Primary Examiner*—Tuan V. Thai
(74) *Attorney, Agent, or Firm*—Michael J. Ure

(57) ABSTRACT

Access by a function to a collective resource is controlled by requiring that the function waits for a minimum number of clock cycles CLK called latency [LAT] between two successive accesses of the function. The function is further required to wait a number of cycles called penalty [PEN] which is higher than the latency between two successive accesses when a given number of successive accesses separated in time by at least the value of the latency has taken place beforehand. Registers [REG1, REG2] are decremented (or incremented) with each clock cycle and incremented (or decremented) with each access of the function to the collective resource. Tests [T1, T3, T4] are made with the contents of the registers to authorize [GRT] the access to the collective resource.

10 Claims, 2 Drawing Sheets

DYNAMIC ACCESS CONTROL OF A FUNCTION TO A COLLECTIVE RESOURCE

The invention relates to a method of controlling the access of a function to a collective resource. The invention may be applied, for example, in a data processing device comprising various functions which may need very different memory accesses. A circuit comprising at least a calculation function such as a processor, linked with processing blocks of data which may be audio, video or graphics data is an example of such a device. Certain audio, video or graphics data processing blocks require real-time behavior (graphics units . . . ) and thus substantially continuous memory access. On the other hand, other data processing blocks may be satisfied with less continuous memory access as long as over a given period of time a certain number of accesses are guaranteed to them. A calculation function generally accesses the memory by access bursts to fill, for example, its cache memory. If the access of the calculation functions is not limited, the data processing processes are blocked. This is particularly a problem for real-time processes. It is thus necessary to control the memory access of the calculation function.

It is possible to manage the access to the collective resource by means of an interface. The interface utilizes an access scheme on two levels, that of the access itself and that of the cycle. The invention relates to the arbitration for the access.

A possible access scheme limits the accesses of a function to the memory by prohibiting too frequent accesses of the function. In practice a register is programmed in the interface to impose a minimum number of clock cycles between two successive accesses. If the number of cycles between two accesses is lower than the value written in the register, the access will be deferred until this value is reached. The function, for example, a calculation function, having asked for access will then wait for several cycles before admission. The value written in the register is a function of the needs of other functions who share the memory.

This access scheme is mentioned in European patent application EP 0921468. This patent application relates to a memory access control circuit in which notably a register is used containing a latency magnitude which imposes a fixed number of cycles between two successive accesses to a collective resource.

It is an object of the invention to permit dynamic use of the passband. The invention takes the following aspects into consideration. The calculation functions generally need to have specific access to memories. Most of the time a calculation function does not need to access the memory, because the necessary data are stored in another memory that belongs to it such as a cache memory, for example. From time to time the calculation function needs to access instructions that are not present in the cache memory. In this case the calculation function will need a burst of access to the external memory to complete its cache memory. The need for access of a given function may thus vary over time in a critical manner. The fixed access scheme mentioned earlier distributes the access capacity which the collective resource offers over the various functions in a predetermined manner. This causes a long wait for the calculation function in this example to access the necessary data. Thus the invention takes an interest in the access to the collective resource by the functions for which no access is required during a certain period of time until a burst of access is required.

Actually, a method of controlling the access of a function to a collective resource in accordance with the opening paragraph is characterized according to the invention in that it includes the steps of:

imposing a minimum number of clock cycles called latency between two successive accesses of the function, imposing a number of cycles called penalty which is higher than the latency between two successive accesses when a given number of successive accesses, separated by approximately the latency and by at least the same value as the latency, has previously occurred.

The invention permits to take account of the preceding accesses of the function to assign an access authorization or not. Actually, the invention takes the number of accesses of the calculation function in a nearby past into account by imposing a number of cycles between two successive accesses which is higher than the latency when this number of accesses in a nearby past is higher than a given number.

Thus the method according to the invention adds to a fixed condition of access a condition of access to the memory which permits to optimize the brief access bursts which represent the majority of the accesses of the calculation functions. In a preferred embodiment the new condition is calculated so as to propose on average as many accesses to the calculation function as in the case of a fixed access scheme optimized for a proper functioning of the other functions. In particular with the invention the latency magnitude, which determines the shortest interval between two successive accesses by way of a fixed access scheme, is smaller than that of the fixed access scheme.

In practice the present invention also relates to a computer program to implement a method according to the invention, a memory access control circuit possessing registers and comparing means for implementing a method according to the invention and a data processing device in which a circuit according to the invention is advantageously used.

These and other aspects of the invention are apparent from and will be elucidated, by way of non-limitative example, with reference to the embodiments described hereinafter.

The following remarks relate to reference signs. Similar entities are designated by identical letters in all the Figures. Various similar entities may appear in a single Figure. In that case a number or a suffix is added to the letter reference so as to distinguish between similar entities. The number and the suffix may be omitted for convenience. This applies to the description as well as the claims.

Figure 1:
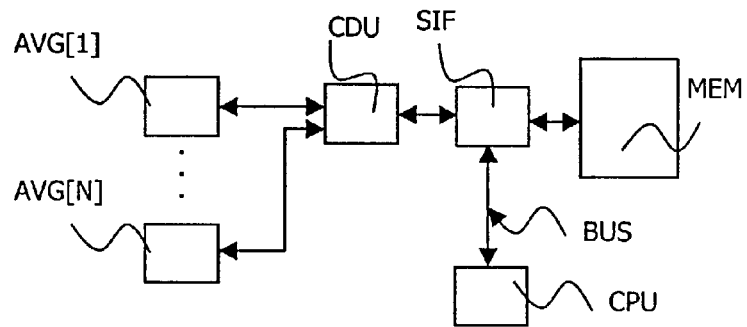
FIG. 1 is a diagram of a signal processing device according to the invention.

FIG. 1 is a diagram of a signal processing device according to the invention. This Figure relates to a preferred embodiment in which the invention can be advantageously used. The function whose access is controlled according to the invention is a calculation function such as a processor CPU. A collective resource, here a memory MEM is shared by the function CPU with other functions called AVG. According to the preferred embodiment described in FIG. 1 these other functions are audio, video or graphics data processing functions AVG[1] to AVG[N]. A unit CDU embodies a first interface between these functions and a control interface SIF of the accesses to the memory MEM.

The processor CPU sends its requests over a peripheral connection bus BUS to an interface SIF. The requests for access to the collective resource, which is a memory MEM in the preferred embodiment, are received by the interface SIF which controls the accesses to the memory MEM according to the invention. The memory MEM may be any kind of memory that is capable of being shared by various functions, for example, a dynamic memory (SDRAM, DRAM), a static memory (SRAM), a non-volatile memory (FLASH, ROM, . . . ) or a mass storage unit (HDD, CD, . . . ) . . . .

Figure 2:
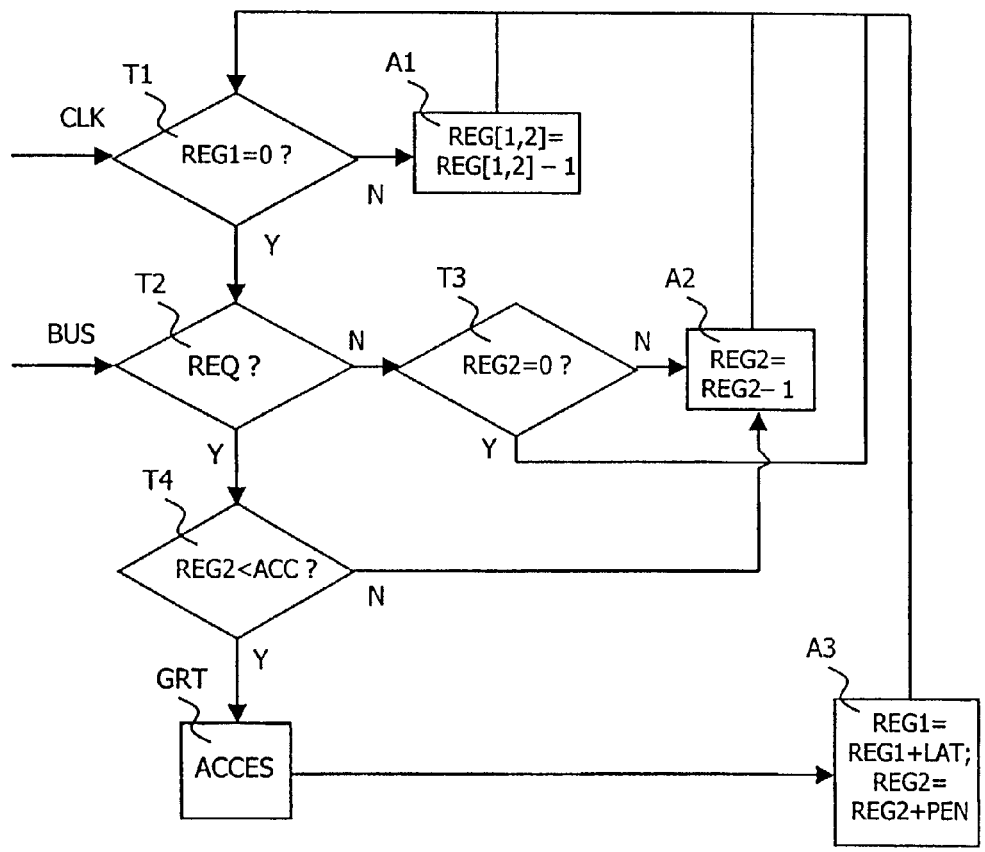
FIG. 2 illustrates the operation of a memory access control circuit according to the invention.

FIG. 2 illustrates the functioning of the memory access control method according to the invention. FIG. 2 describes a preferred embodiment advantageously implemented in an interface SIF such as represented in FIG. 1.

In this preferred embodiment the step of imposing latency is realized via a comparison to zero of a first value decremented by unity at each memory cycle where the calculation element does not access the memory and where said first value is greater than zero, said first value being incremented by a magnitude called latency with each access of the calculation element. In this preferred embodiment the step of imposing penalty is realized by a comparison to a fixed magnitude different from zero called account, calculated as a function of the given number of successive accesses, of a second value decremented by unity to each memory cycle where the calculation element does not access the memory and where said second value is greater than zero, said second value being incremented by a magnitude called penalty with each access of the calculation element. In this preferred embodiment the access authorization of the calculation element to the memory upon request by the calculation element is granted if said first value is zero and if said second value is smaller than or equal to the account.

In the preferred embodiment the principle according to the invention may practically be used in an access control circuit of a function to a collective resource by the use of three configuration registers which contain each a configuration magnitude: account ACC, latency LAT and penalty PEN. The invention also uses two provisional registers REG1 and REG2 containing the values decremented by 1 when they are not already zero, with each cycle in which the processor does not access the memory. The method according to the invention is regulated by a clock CLK which launches with each cycle a series of tests as described in FIG. 2. With each cycle a first test T1 compares the value contained in the register REG1 to zero. In the case where this value REG1 is not zero, the access of the processor CPU to the memory MEM cannot always be authorized. Thus it makes no difference at this stage to know whether a request has been formulated by the processor. The request is thus as if it is masked. On the other hand, it should be noted that as the penalty PEN is greater than the latency LAT, REG2 cannot be zero if REG1 is not zero. Here the two registers are then decremented by unity in A1 after which the system waits for the next cycle.

Figure 3:
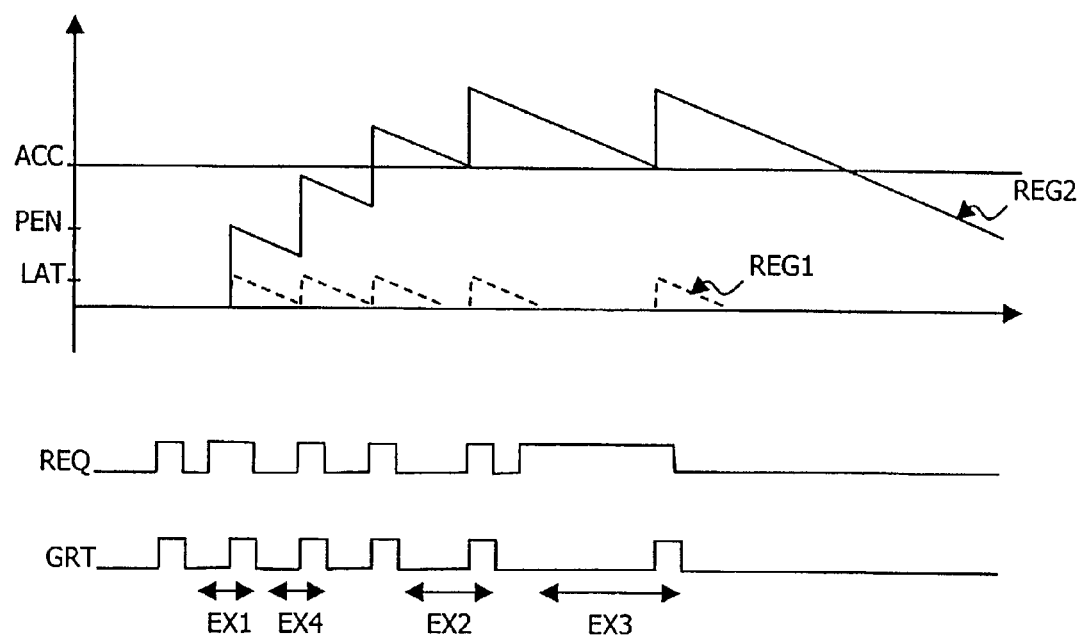
FIG. 3 illustrates the accesses of a calculation function to a collective resource according to the invention.

FIG. 3 proposes another illustration of the decrementation of the two registers REG1 represented in a dashed line and REG2 represented in a solid line. When on the request line REQ the processor makes a request for access whereas REG1 is not zero, this request is not met with in the access authorization line GRT until REG1 is zero. This is the case with the second request for access EX1 in FIG. 3. The latency LAT thus corresponds to an equivalent of a fixed access scheme as displayed in the state of the art. Here the necessity shows up to have a penalty PEN that is greater than the latency LAT. However, we will see that the invention permits to diminish the fixed latency magnitude in a consistent manner which offers the advantages discussed above for the access by the processor by brief access bursts.

When REG1 is zero, the preferred embodiment makes a test T2 for the presence of request REQ of the processor. If at the present clock cycle CLK no request REQ is present on the bus BUS coming from the processor CPU, a test T3 is made to find whether REG2 is zero. If REG2 is zero, the system waits for the next cycle to restart the method according to the invention. If REG2 is not zero, REG2 is decremented by unity in A2 and then waits for the next cycle. This is case EX2 in FIG. 3. Actually, during EX2, REG1 is zero, REG2 is not zero and decremented with each clock cycle CLK until a new request or until the cancellation of REG2. If a request REQ is presented to the memory interface SIF via the bus BUS coming from the processor CPU, a test T4 compares REG2 to a configuration magnitude called account ACC. This configuration magnitude is advantageously stored in a configuration register and a simple comparator compares the two values each present in a register. We will see in the following how this configuration magnitude is determined. When REG2 is greater than the account ACC, the access is not authorized according to the invention and REG2 is then decremented in A2. This system then waits for the next cycle. This is the case EX3 in FIG. 3: REG2 is greater than ACC and the access is not authorized although REG1 is zero. When REG2 is smaller than or equal to ACC, the access is authorized in step GRT and the magnitudes REG1 and REG2 are incremented respectively by the latency LAT and by the penalty PEN in A3. Then the system waits for the next clock cycle CLK. In FIG. 3 this corresponds, for example, to the case EX4 where an access is authorized because REG2 is smaller than ACC.

The FIG. 2 shown merely indicates a preferred embodiment. Other embodiments in which more or fewer registers are used which test and compare the values in a different order are possible. Thus, for example, rather than decrementing register values by a given value until they reach 0, it is possible to increment these registers until they reach the given value. In this case the access by the function to the collective resource is, for example, also authorized by comparison of register values that change with configuration register values. The principle searched for remains the same, it relates to the access authorization on two conditions: a minimum latency condition and a condition for the presence of access in a nearby past. The registers used by the method according to the invention are advantageously implemented inside the memory interface SIF such as represented in FIG. 1. The interface thus comprises three configuration registers intended for the implementation of the invention and one or preferably two changing registers. In the case where a single register is used, the value written in this memory may be used in similar tests to tests T by using stored values for each access of the function and subtractions between the written current value and the stored values. Similarly, the interface thus includes, for example, at least one comparator for the tests of the magnitudes, an adder and a multiplexer for choosing, for example, depending on the result of the tests, the values (−1, LAT or PEN) which are to be added to each register REG1 and REG2. The adder-multiplexer pair can thus permit to carry out the steps A1, A2 and A3.

More generally, a control circuit for implementing the method according to the invention comprises registers, comparators, multiplexers, adders to carry out the operations with the magnitudes which are necessary for the invention such as described in FIG. 2. These elements are conventionally known to those skilled in the art who can arrange them in many ways to carry out the method according to the invention. A person skilled in the art may utilize software elements or hardware elements to carry out the method. Advantageously, the configuration magnitudes are defined as hardware in hardware registers. The use of hardware configuration registers makes it possible to be faster than when software means are used which are subject to a clock rate. The invention notably permits to accelerate the processes because when the processor CPU has memory accesses which are more extended in a shorter time, the speed of the process is increased compared to a fixed access scheme. Thus, given the fact that the invention permits to avoid a slowing down of the operation of a function, the speed of the access control method is an important issue so as not to lose the advantage of the invention.

The present invention may particularly be implemented in equipment intended for processing digital video data with coding, decoding, compression and correction of the data stream (DVD, recording, digital TV with channel decoding, real-time recording, graphics interface for subtitling . . . ). Said apparatus may possess interfaces to hard discs to read and write data at the same time, to display-elements . . . . These interfaces and the functions of the apparatus are advantageously managed inside a specific circuit which regroups them. Said circuit is linked with data receiving and processing peripherals and with a collective memory which is used for all the functions of the circuit. It is thus interesting that a part of the circuit manages the interface between at least a processor present in the data processing circuit and the collective memory. The accesses of said processor will advantageously be controlled according to the invention.

In the following will be described more precisely the invention and particularly a calculation of latency, penalty and account magnitudes in the case of a circuit intended to carry out a data processing as described above.

While reference is made to FIG. 1, the memory MEM is here an SDRAM, the blocks AVG are audio, video and graphics data processing blocks as described above, the CPU is advantageously a processor for audio, video and graphics data. Such a CPU sends macro commands according to a predefined format comprising a request, an address and a command. The SIF regularly receives macro commands coming from requests generated by the blocks AVG via a unit CDU. In the blocks AVG there are real-time blocks for which the time to receive data is critical for the operation of the apparatus. This is the case, for example, with display blocks . . . . There are also other blocks inside the AVG for which the access time to the data is not critical for the operation, but which nevertheless over rather long periods need to receive or send a certain number of data. The number of blocks AVG increases with the number of possible functions of the apparatus and the complexity of the processes used. With the evolution of the techniques this implies and will imply ever more to give ever more passband to the blocks AVG. The available passband for the processors is reduced accordingly. If a method of controlling access of a processor to the memory is configured in a fixed manner such as proposed in the state of the art, the processor has an ever more reduced access authorization frequency. The stream of requests from AVG is generally continuous and regular. Actually, the displays and other data processing functions need to have continuity and regularity of the access to the memory. The limitation of storage capacity of the data AVG waiting for being processed is also responsible because the passband of access to the memory for the AVG is to be increased when the number of blocks AVG increases.

Thus in a simple configuration, while supposing that a 500 Mbytes passband is available, and that the blocks AVG need to have 400 Mbytes for their functioning, 100 Mbytes remain for the CPU. This brings the number of latency cycles for the CPU for having 8-word accesses to 40. The CPU generally requests access to the memory by access bursts, for more often than not it already has many data in its cache memory. When it has to complete this cache memory it is, on the other hand, a pity that the CPU can only access the memory every 40 cycles. The speed of the CPU may be diminished in a critical manner in similar cases. The use of the invention is here particularly advantageous for, on the one hand, the CPU needs to have access only rarely and in generally relatively short access bursts and, on the other hand, the partition of the blocks AVG in real-time blocks and blocks in which the time is less critical permits to have additional passband at its disposal. Actually, in the simple case where half the blocks AVG function in real time, only 200 Mbytes will be absolutely necessary for a reasonable period of time which would correspond to an access burst. In case of a peak of requests for access from the CPU, that is to say, during a short access burst, it is thus possible, without being detrimental to the operation to assign 300 Mbytes to the CPU for a short duration. This is what the invention permits to do in practice. Indeed, for accesses of 8 words it is thus possible in a peak period to attain access every $14=(500*8)/300$ cycles. This is thus a minimum limit for the latency value LAT which defines the minimum number of cycles between two successive accesses. However, this value is constant and fixing the value at 14 gives a too important access to the CPU for the blocks AVG to function correctly in the long run. Moreover, the operation of the circuit may cause the loss of certain cycles (for example 50 cycles every 500 may then be lost) causing a corresponding diminishing of the passband. If the preceding system is applied while taking a low value for the latency (for example 14), the percentage of occupation of the passband by the CPU is 60. This is too much. The finally chosen values and their relative ratios must, in addition, make it possible to respect the duration in which it is possible to delay the non-real-time accesses AVG. During this period the passband occupied by the CPU is calculated by multiplying the number of accesses by the length of the access (8, 16, 32 words . . . ), while the maximum number of accesses is taken, that is to say, for continuous requests made by the calculation function during this time. If it is possible in a period equal to about 90 cycles to delay part of the process AVG, one may reasonably give on average 40% of the passband to the CPU for this duration. Then the number of fast accesses (that is to say, separate from the latency) that one wishes to optimize is to be chosen. Here the number of optimized accesses will be four accesses of 8 words. This gives a value of the latency of 22 cycles if one considers that during the 90 cycles only the latency has limited the accesses to the memory. The value of the penalty is thus such that on average on the long term the percentage of occupation by the calculation function (here the CPU) is again about 20, for a proper operation of the blocks AVG. This leads to the choice of the values of the penalty close to 40 which is the fixed value for which an ideal functioning of the AVGs is obtained. The account ACC is determined as a function of the number of accesses of the peaks that one wishes to optimize and of the time during which it is possible to delay the non-real-time accesses AVG. If one wishes to optimize peaks of N successive accesses by the CPU to the memory, it is necessary that ACC is defined by the following equation $N*(PEN-LAT)\sim ACC$. Here ACC will thus be 4*(40−22)=72. The values and their relative ratios will, however, critically depend on data processing processes of the device according to the invention as explained, for example, with reference to FIG. 1. Depending on the requirements of the blocks AVG, these values will be largely different from those discussed here without for all that ruling out the principle of the invention.

There are many ways of using the functional entities presented in the steps of methods according to the invention by software means and/or hardware means accessible to a person of ordinary skill in the art. Therefore, the Figures are diagrammatic. Thus, although the Figures show various functional entities realized by various blocks, this does not exclude that various functional entities are shown in a single software and/or hardware means. Neither does this exclude that a combination of software and/or hardware means permits to realize one functional entity.

Although this invention has been described in accordance with the embodiments shown, a person of ordinary skill in the art will immediately recognize that there are variants of the embodiments shown and that the variants remain within the spirit and scope of the present invention. In particular the word "a" or "an" preceding an element or a step does not exclude the presence of a plurality of these elements or steps. Thus many modifications may be realized by a person of ordinary skill in the art without, however, ruling out the spirit and scope defined by the following claims.

What is claimed is:

1. A method of controlling access of a function to a collective resource, the method including the steps of:
    receiving a request from the function to access the collective resource;
    postponing a second one of two successive accesses by the function by at least a first number of clock cycles called latency; and
    postponing a second one of two successive accesses by the function by a second number of clock cycles called penalty, greater than the first number of clock cycles, as a consequence of a given number of successive accesses of the function to the collective resource having previously occurred within a given number of clock cycles.

2. An access control method as claimed in claim 1, characterized in that the function is a calculation function.

3. An access control method as claimed in claim 1, characterized in that the collective resource is a memory.

4. An access control method as claimed in claim 1, characterized in that the step of imposing latency is carried out via a comparison to zero of a first value decremented by unity with each memory cycle where the function does not access the collective resource and where said first value is greater than zero, said first value being incremented by a magnitude called latency wit each access of the calculation element in that the step of imposing penalty is realized via a comparison to a fixed magnitude different from zero called account calculated as a function of the given number of successive accesses, a second value decremented by unity with each memory cycle where the function does not access the collective resource and where said second value is greater than zero, said second value being incremented by a magnitude called penalty with each access of the function, and in that the authorization of access of the function to the collective resource upon request of the function is granted if said first value is zero and if said second value is lower than or equal to the account.

5. An access control method as claimed in claim 1, characterized in that the numbers called latency and penalty are calculated as a function of an average access of the function to the collective resource, said average access taking account of accesses to the collective resource by other functions.

6. A computer program product embodied on a computer-readable-medium comprising instructions for implementing an access control method as claimed in claim 1.

7. An access control circuit of a function to a collective resource coupled to the circuit, comprising:
    means for receiving a request from the function to access the collective resource;
    means for postponing a second one of two successive accesses by the function by at least a first number of clock cycles called latency; and
    means for postponing a second one of two successive accesses by the function by a second number of clock cycles called penalty, greater than the first number of clock cycles, as a consequence of a given number of successive accesses of the function to the collective resource having previously occurred within a given number of clock cycles.

8. An access control circuit as claimed in claim 7, characterized in that the latency means include a first register programmed for containing a first value decremented by unity with each memory cycle where the function does not access the collective resource and where said first value is greater than zero, said first value being incremented by a magnitude called latency with each access of the function, the latency means further including comparing means for comparing die first value to zero, and in that the penalty means include a second register programmed for containing a second value decremented by unity with each memory cycle where the function does not access the collective resource and where said second value is greater than zero, said second value being incremented by a magnitude called penalty with each access of the function, the penalty means further including means for comparing the second value to a fixed magnitude different from zero called account calculated as a function of the given number of successive accesses, and in that the access of the function to the collective resource is granted upon request of the function if said first value is zero and if said second value is lower than or equal to the account.

9. An access control circuit as claimed in claim 7, characterized in that a magnitudes called penalty are calculated as a function of an average access on the function to the collective resource, said average access taking account of the accesses of other functions to the collective resource.

10. A data processing device including a collective resource divided over various functions, access of at least one of said functions to the collective resource being controlled with an aid of an access control circuit as claimed in claim 7.

* * * * *